(12) United States Patent  
Keightley et al.

(10) Patent No.: US 8,035,823 B2  
(45) Date of Patent: Oct. 11, 2011

(54) HAND-HELD SURFACE PROFILER

(75) Inventors: John Howard Keightley, Langley (CA); Adriano Goncalves Cunha, Surrey (CA); Mark Aurele Louis Dumont, Aldergrove (CA)

(73) Assignee: 3DM Devices Inc., Aldergrove, British Columbia (CA)

(*) Notice: Subject to any disclaimer, the term of this patent is extended or adjusted under 35 U.S.C. 154(b) by 345 days.

(21) Appl. No.: 12/204,915

(22) Filed: Sep. 5, 2008

(65) Prior Publication Data

US 2010/0060904 A1   Mar. 11, 2010

(51) Int. Cl.  
*G01B 11/30* (2006.01)

(52) U.S. Cl. ........................ 356/606; 356/608

(58) Field of Classification Search ........... 356/601–608  
See application file for complete search history.

(56) References Cited

U.S. PATENT DOCUMENTS

| | | |
|---|---|---|
| 4,498,778 A | 2/1985 | White |
| 4,637,715 A | 1/1987 | Idesawa |
| 4,679,937 A | 7/1987 | Cain et al. |
| 5,615,003 A | 3/1997 | Hermary |
| 5,717,455 A | 2/1998 | Kamewada |
| 6,249,007 B1 | 6/2001 | Gooch et al. |
| 6,289,600 B1 | 9/2001 | Watts |
| 6,539,638 B1 | 4/2003 | Pelletier |
| 6,815,701 B2 | 11/2004 | Schlenkert et al. |
| 6,931,149 B2 | 8/2005 | Hagene et al. |
| 6,965,843 B2 | 11/2005 | Raab et al. |
| 7,271,377 B2 | 9/2007 | Mueller |
| 2005/0237519 A1 | 10/2005 | Bondurant et al. |
| 2006/0232787 A1 | 10/2006 | Hoffmann et al. |
| 2009/0237677 A1* | 9/2009 | Aoki et al. ........... 356/602 |

FOREIGN PATENT DOCUMENTS

| | | |
|---|---|---|
| JP | 8-114553 | 5/1996 |
| JP | 2000-258141 | 9/2000 |
| JP | 2002-22671 | 1/2002 |
| JP | 2007-57305 | 3/2007 |
| WO | 02/091913 A1 | 11/2002 |

* cited by examiner

*Primary Examiner* — Michael P Stafira  
(74) *Attorney, Agent, or Firm* — Oyen Wiggs Green & Mutala LLP

(57) ABSTRACT

A light-emitting hand-held surface profiler for scanning and profiling the surfaces of objects has a transparent housing, a focusable light source, a conical mirror aligned to redirect light emitted by the light source onto a surface to be profiled, an imaging sensor and a lens aligned to redirect toward the imaging sensor light reflected by the surface onto the lens. The light source, conical mirror, imaging sensor and lens are mounted within the housing and positionally referentially coupled to the housing.

4 Claims, 13 Drawing Sheets

HAND-HELD SURFACE PROFILER

TECHNICAL FIELD

This invention relates to surface profilers. Particular embodiments of the invention relate to light-emitting surface profilers for scanning and profiling the surfaces of objects.

BACKGROUND

The prior art has evolved surface profilers for scanning and profiling the surfaces of an object to determine the object's three-dimensional shape. Some surface profilers have touch probes which contact a surface of the object. Other surface profilers emit light or radiation (e.g. laser light) and detect its reflection from a surface.

Some light-emitting surface profiling systems have a laser scanner that is attached to a moveable arm equipped with encoders to determine relative motion of the scanner. The laser scanner is swept over an object and a camera takes images of the object's surface from multiple points of view as determined from the encoders. Reconstruction software processes the scanned data to produce three-dimensional surface maps of the object. However, the size of the moveable arm, the scanner and the camera inhibits use of such surface profiling systems to scan the interior of small objects.

Other light-emitting surface profiling systems for scanning the interior of objects have a laser mounted at the end of a stalk. Light emitted by the laser is incident on a target surface and imaged onto a camera by a lens positioned behind the laser. As the stalk tends to oscillate or move, accurate scanning measurements are difficult to obtain using such a surface profiling system.

As seen in FIG. 1A, triangulation may be used by light-emitting surface profilers to measure locations on a surface of an object which is illuminated by a light source, such as a laser 12, and obliquely viewed by a camera 14. Camera 14 incorporates an imaging sensor 16 for detecting light and a lens 15 for focusing and imaging light onto imaging sensor 16. In single point triangulation, laser 12 emits a laser beam 18 which is incident at a point (X,Y) on surface 10 of object 11. Laser beam 18 is reflected by surface 10 as laser beam 18', and laser beam 18' is imaged by lens 15 to a point (x,y) on imaging sensor 16. A laser beam 18 that is incident on another surface 10' of object 11' at a different point (X',Y') is reflected by surface 10' as laser beam 18" which is imaged to a different point (x',y') on imaging sensor 16. The relationship between locations on the surface of an object and locations on imaging sensor 16 is determined by the physical arrangement of laser 12 and camera 14. In particular, the distance between laser 12 and camera 14 (i.e. baseline 20) is fixed, as well as the angle θ between laser beam 18 and baseline 20. As such, the location of points (X,Y), (X',Y') on a surface can be determined from the measured location of points (x,y), (x',y'), respectively, on imaging sensor 16.

Rather than illuminating a single point on a surface as seen in FIG. 1A, laser beam 18 may be spread so that a laser line 22 (i.e. a series of points) is projected onto surface 10, as seen in FIG. 1B. Line 22 is reflected and imaged as a corresponding line 23 on imaging sensor 16. The spreading of laser beam 18 advantageously allows more data points to be collected at once, as line 22 encompasses multiple points (X,Y) on surface 10 which are imaged on imaging sensor 16 as multiple points (x,y) on line 23. By fixing the physical arrangement of laser 12 and camera 14, triangulation techniques may be applied to determine the locations of points on line 22 on surface 10 from the measured locations of points on line 23 on imaging sensor 16.

The accuracy of light-emitting surface profiling systems using triangulation techniques may be affected by several factors. These include baseline shifts or variations. FIG. 2A illustrates the effect of moving camera 14 away from laser 12 by a distance s to define a new baseline 20'. As a result of this baseline shift, a point (X,Y) on surface 10—which would otherwise have been imaged at point (x,y) on imaging sensor 16 at baseline 20—is imaged at point (x',y') on imaging sensor 16 at the new baseline 20'. However, point (x',y') on imaging sensor 16 corresponds to a different point (X',Y') in the path of laser beam 18 at baseline 20. Therefore, a surface profiling system which is calibrated for a particular baseline 20 will not provide accurate measurements if camera 14 and/or laser 12 are moved to define a new baseline 20'. The difference $\Delta d_1$ between points (X,Y) and (X',Y') corresponds to the error caused by the baseline shift.

Another factor which may affect the accuracy of light-emitting surface profiling systems is a shift in the direction of the light beam emitted by the light source. FIG. 2B illustrates the effect of changing the angle between laser beam 18 and lens axis 24 by an angle shift φ. As a result of this angle shift, light which would otherwise have been incident at point (X,Y) on surface 10 and imaged at point (x,y) on imaging sensor 16 is instead incident at point (X',Y') on surface 10 and imaged at point (x',y') on imaging sensor 16. The difference $\Delta d_2$ between points (X,Y) and (X',Y') corresponds to the error caused by the angle shift.

There is a need for a surface profiler for scanning interior and exterior surfaces of objects in a range of shapes and sizes, which addresses the scanning inaccuracies and other disadvantages of prior art surface profilers.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1A:
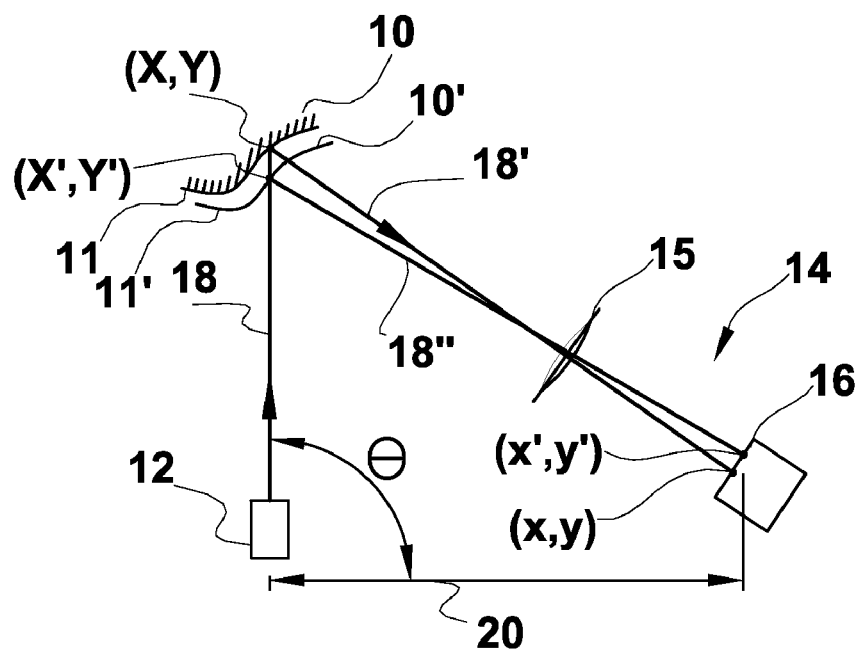
FIG. 1A schematically depicts optical ray tracing for a light-emitting surface profiling system using single point triangulation to determine the location of a point on a surface of an object.
Figure 1B:
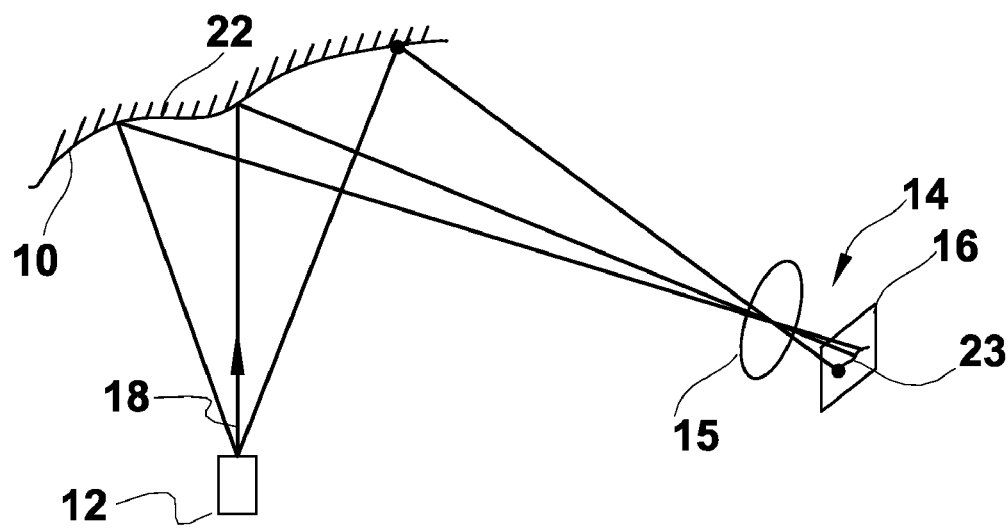
FIG. 1B schematically depicts optical ray tracing for a light-emitting surface profiling system using multiple point triangulation to determine the location of points on a surface of an object.
Figure 2A:
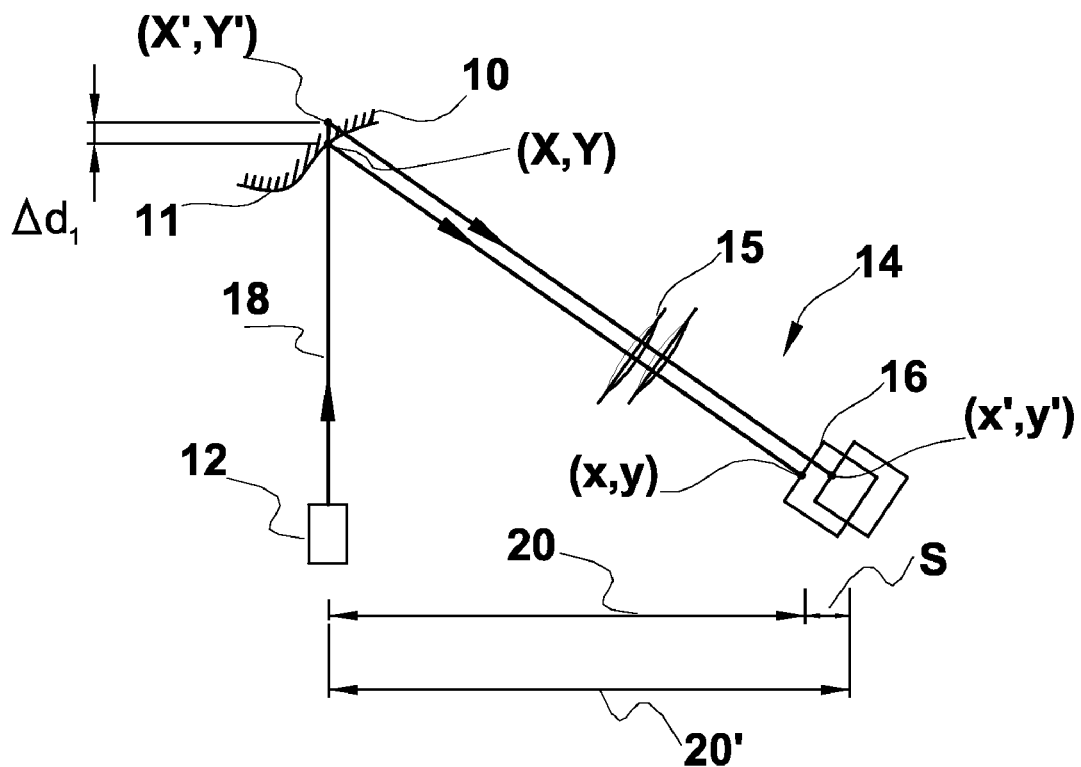
FIG. 2A schematically depicts optical ray tracing for a light-emitting surface profiling system illustrating the effect of a shift in baseline between the light source and camera.
Figure 2B:
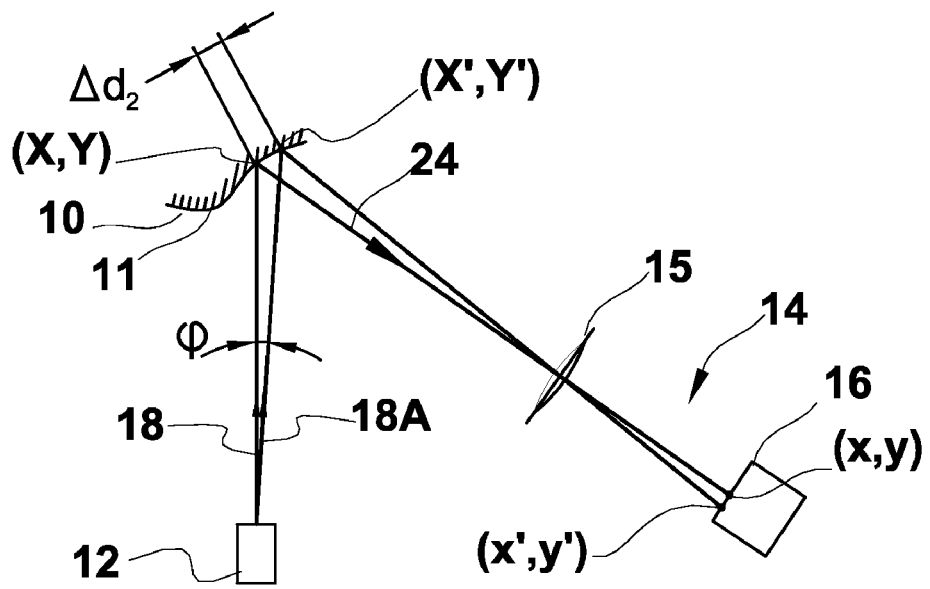
FIG. 2B schematically depicts optical ray tracing for a light-emitting surface profiling system illustrating the effect of a shift in the direction of a light beam emitted by the light source.
Figure 3:
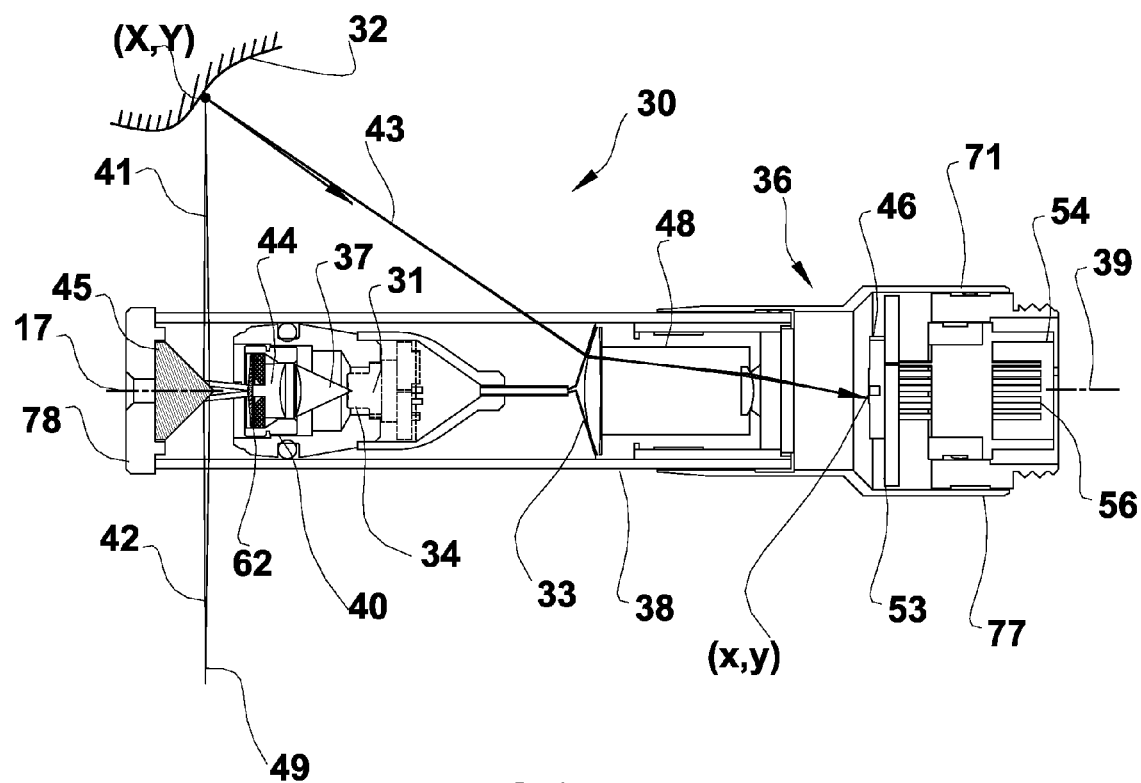
FIG. 3 is a sectional view of a surface profiler taken along line A-A of FIG. 3A, and shows optical ray tracing for a disc-shaped scanning beam.
Figure 3A:
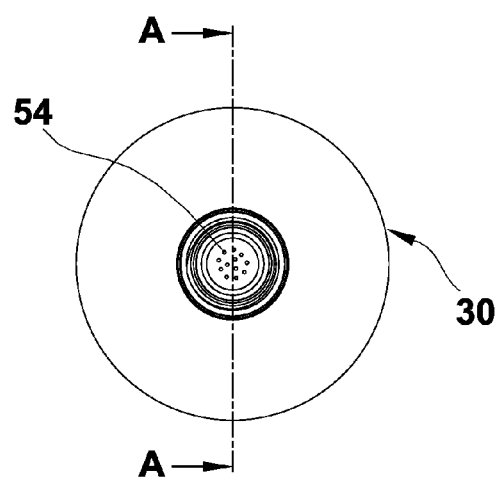
FIG. 3A is a rear elevation view of the FIG. 3 surface profiler.

FIG. 3 shows a surface profiler 30 for scanning a surface 32. Surface 32 may be the exterior surface of an object or the interior surface of an enclosed or semi-enclosed object. Surface profiler 30 has a light source, such as a focusable laser module 34, for illuminating surface 32. Laser module 34 incorporates a laser diode 31 (e.g. Mitsubishi™ ML1013L laser diode) and focusing lens. Surface profiler 30 also has a camera 36 incorporating an imaging sensor 46 for detecting light and a lens 48 for imaging light onto imaging sensor 46. To scan surface 32, laser diode 31 is excited to emit a laser beam 37. Laser beam 37 is directed through an optical system 40 which spreads the laser light into a laser disc 42, illuminating surfaces of objects located in the plane of laser disc 42. FIG. 3 traces the path of a light ray 41 of laser disc 42 which is incident on surface 32. Light ray 41 is reflected by surface 32 as light ray 43 onto lens 48. Light ray 43 is then focused by lens 48 onto imaging sensor 46.

In the illustrated embodiment, laser module 34, optical system 40 and camera 36 (collectively, the scanner components) are contained within and positionally referentially coupled to a rigid housing 38. As used herein, "positional referential coupling" of components to housing 38 means positioning and aligning the components in or relative to housing 38 and coupling the components to housing 38 so that their positions are fixed relative to housing 38.

Housing 38 is transparent along its length or at least along the portions of housing 38 surrounding laser disc 42 and lens 48. Housing 38 may be tubular or cylindrical in shape. The circular cross-section of a tubular or cylindrical housing 38 provides optimal bending stiffness for housing 38 along directions normal to the surface of housing 38. The bending stiffness facilitates more accurate measurements when applying triangulation techniques to determine locations on a surface, because the bending stiffness ensures that the angle θ between laser beam 18 and baseline 20 remains constant, and that baseline 20 is fixed. In the illustrated embodiment, housing 38 has a constant cross-sectional diameter along most of the length of housing 38. However, a portion of housing 38, at the rear end 77 of housing 38, may have an increased cross-sectional diameter to accommodate the connector components. Housing 38 may be formed of a transparent material such as quartz (e.g. Heraeus Suprasil® 300) which has a low coefficient of thermal expansion and high scratch-resistance.

The scanner components may be positionally referentially coupled to housing 38 so that each component is aligned relative to a longitudinal axis 39 of housing 38. Laser module 34 (which may be pre-assembled with laser diode 31 and focusing lens prior to mounting in housing 38), may be positioned within an O-ring and then inserted together with the O-ring in housing 38. Laser beam 37 may be aligned with axis 39 of housing 38 by exciting laser diode 34 to emit light, directing the focused laser beam 37 toward a distant stationary object, rotating housing 38 about axis 39, and observing any wander (movement) of the incident light on the stationary object as housing 38 is being rotated. The tilt of laser module 34 may be adjusted to reduce the wander of the focused laser beam 37 on the stationary object. Once the wander has been reduced to an acceptable level, the position of laser module 34 in housing 38 may be fixed by applying an epoxy or UV (ultraviolet) curing adhesive between laser module 34 and housing 38. Subsequently, optical assembly 40 may be inserted in housing 38, and its components aligned and fixed in position as described in further detail below.

Camera 36 is then slid into housing 38. Wiring is positioned and electrically connected to camera 36 and laser module 34. A cover 71 may be slid over rear end 77 of housing 38. Camera 36 may be secured to cover 71 by injecting epoxy or UV curing adhesive through apertures in the periphery of cover 71. The position of camera 36 may be adjusted by sliding cover 71 along housing 38 (which therefore also slides camera 36 along housing 38) while monitoring the level of focus of the video image produced by camera 36.

The mounting of the scanner components to housing 38 provides several advantages, including:

- the compact cylindrical shape of housing 38 facilitates the scanning of interior or exterior surfaces of objects having a wide range of shapes;
- the positional referential coupling of the scanner components to housing 38 facilitates assembly and alignment of the scanner components;
- the positional referential coupling of the scanner components to housing 38 provides a stable baseline between laser module 34 and camera 36, and fixes the plane of laser disc 42 relative to camera 36, which are important for taking accurate scanning measurements;
- the transparency of housing 38 permits 360° viewing by lens 48;

housing 38 shields the scanner components from moisture, dirt and the like, and helps prevent misalignment of the scanner components which may result from contact with outside objects; and housing 38 provides a thermally stable support structure for the scanner components.

Surface profiler 30 may be sufficiently compact to be hand-held. For example, in some embodiments, housing 38 may be a transparent tube which is 6 cm long and 1.6 cm in diameter. A surface profiler 30 having a housing 38 of this size may be hand-held to scan the interior of objects having a diameter or width of between 3 cm and 8 cm, or to scan the exterior surfaces of objects which are about 2 cm away from housing 38, for example.

Figure 4:
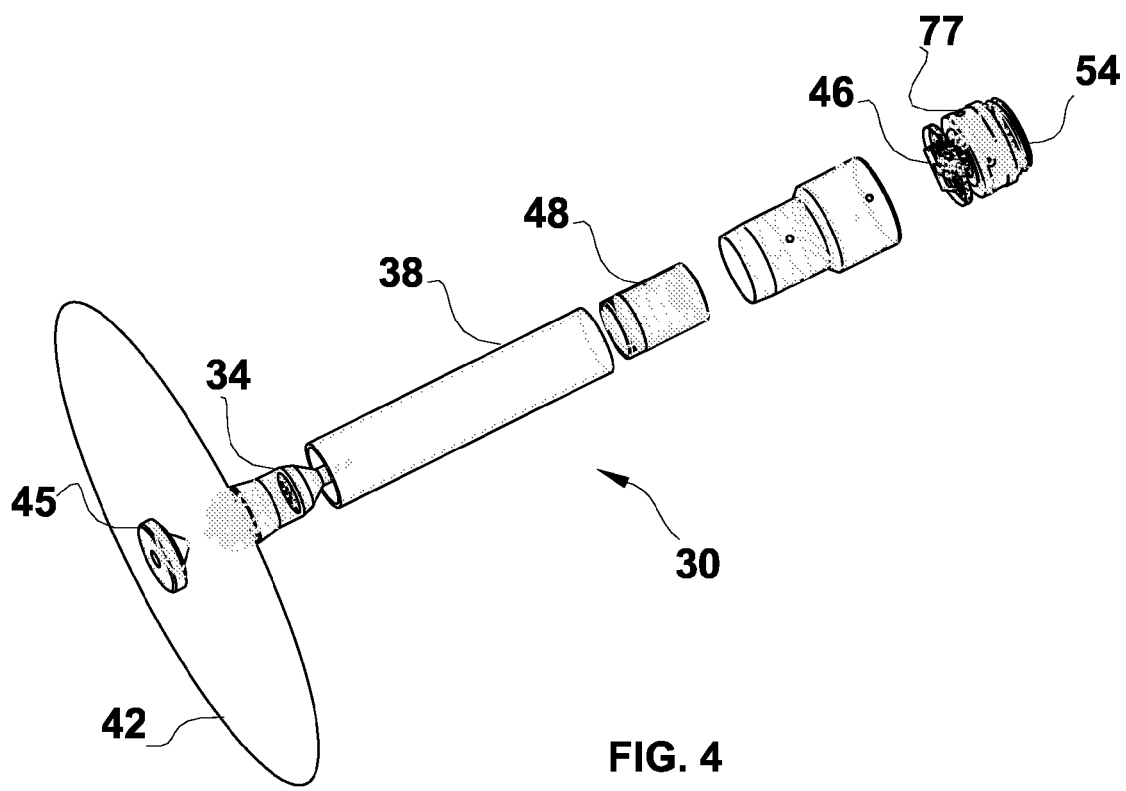
FIG. 4 is an exploded perspective view of the FIG. 3 surface profiler.
Figure 4A:
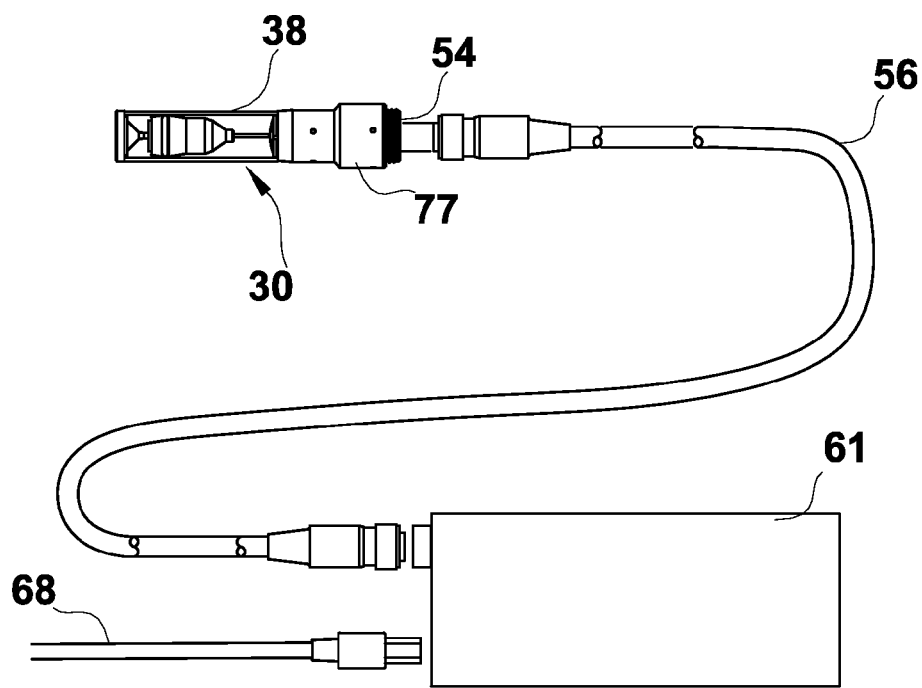
FIG. 4A is a top elevation view showing a control and processing unit connected by a cable to a connector of the surface profiler.

As seen in FIG. 4A, a connector 54 is provided at the rear end 77 of housing 38. Connector 54 is connected to a cable 56 for supplying power and control signals to laser module 34 and camera 36 from a control and processing unit 61 (having a programmable controller and processor) and computer (not shown). Control and processing unit 61 may be a microcontroller (e.g. Cypress™ CY7C64613-128NC), an FPGA (e.g. Altera™ EP1K100QC208-3) and the like. Control and processing unit 61 controls the capture of images by camera 36 and transmits data received from camera 36 to the computer via a cable 68. For example, control and processing unit 61 may send a pulsed timing signal to camera 36 (e.g. 15 samples/second) and read image data from the camera array at the end of the camera exposure for each sample. Control and processing unit 61 may pre-process the image data obtained from camera 36 prior to transmitting the data, via cable 68, to the computer for further processing, viewing and/or storage. Control and processing unit 61 may also control the supply of power to laser module 34 so that laser module 34 is turned on and off at the start and end of each camera exposure, respectively.

Laser module 34 is powered by a pair of thin wires 33 extending through housing 38 and connected to cable 56. In the illustrated embodiment of FIG. 3, wires 33 extend across the light-incident side of lens 48. However, wires 33 are positioned away from the focused image plane of lens 48 so that wires 33 do not substantially interfere with or obstruct the captured image of the illuminated surface.

In the illustrated embodiment of FIG. 3, optical system 40 spreads laser beam 37 emitted by laser diode 31 into a laser disc 42. Optical system 40 includes a laser lens 44 (e.g. Kodak™ A375 aspheric) and a 90° conical mirror 45 (e.g. made from borosilicate glass and having a reflective aluminum overcoat). Laser lens 44 and conical mirror 45 are aligned so that laser beam 37 is directed by laser lens 44 onto conical mirror 45. Light which is incident on the conical surface of conical mirror 45 is redirected into a laser disc 42 oriented in a laser plane 49 perpendicular to the longitudinal axis 17 of conical mirror 45. The position of lens 44 with respect to laser beam 37 may be adjusted to focus the laser light incident at surface 32.

In assembling surface profiler 30, alignment of conical mirror 45 within housing 38 may be accomplished by holding housing 38 stationary while rotating a light sensing meter 360° about housing 38 in the plane of laser disc 42. The position of conical mirror 45 may be adjusted to reduce variations in light detected by the light sensing meter as it rotates about housing 38. Once the position of conical mirror 45 has been suitably adjusted, conical mirror 45 may be cemented to housing 38 by applying an epoxy or UV curing adhesive.

Lens 48 may consist of a wide angle lens and optical interference filter. Lens 48 may have grooves on either side, such that when lens 48 is positioned in housing 38, wires 33 passing between laser diode 34 and cable 56 are received in the grooves on lens 48. Once in its position in housing 38, lens 48 may be cemented to housing 38 by applying an epoxy or UV curing adhesive.

Figure 5A:
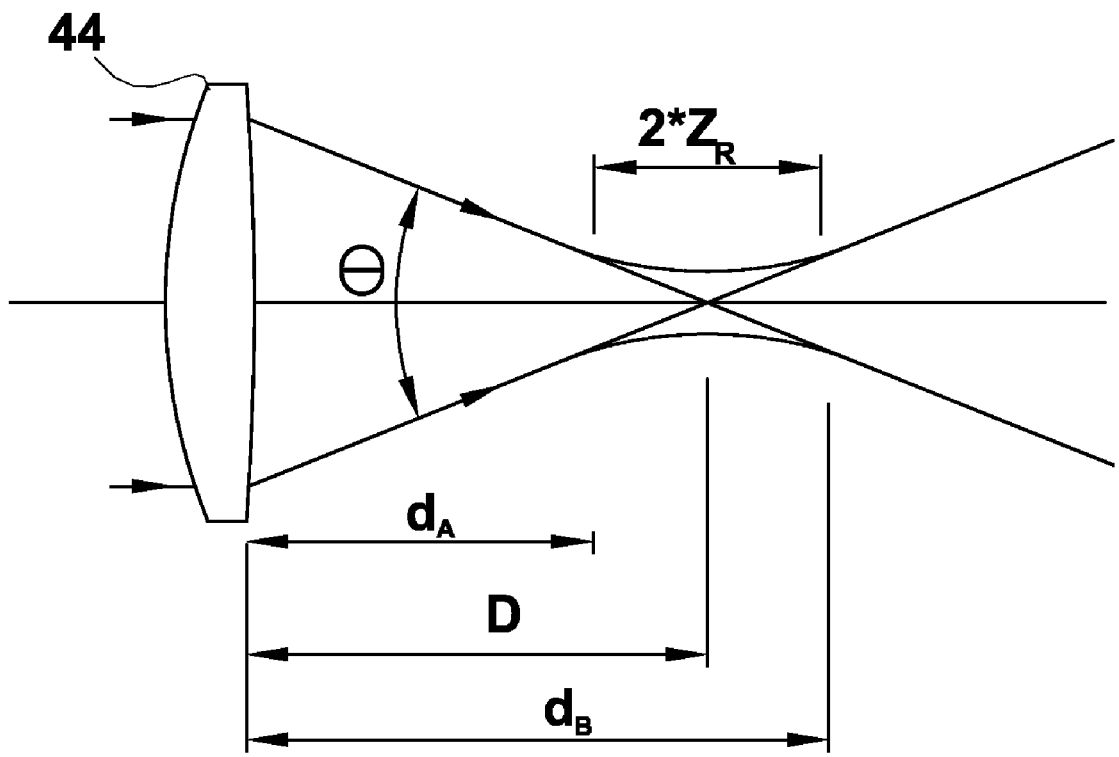
FIG. 5A schematically depicts optical ray tracing for a laser beam directed through a focusing lens, showing the convergence of the focused laser beam.

As surface profiler 30 may be used for a range of measurements extending from the outside surface of housing 38 to the field of view of lens 48, the laser beam incident on surface 32 preferably exhibits a long depth of focus. As seen in FIG. 5A, the depth of focus $Z_R$ (i.e. the Rayleigh range) of a laser beam is proportional to the square of the convergence angle $\Theta$ of the focused laser beam. The Rayleigh range is related to convergence angle $\Theta$ as follows:

$$Z_R = \frac{4 \times \lambda}{\pi \times \Theta^2}$$

where $\lambda$ is the wavelength of light in mm and $\Theta$ is represented in radians.

For a surface profiler 30 scanning a surface 32 which is located 15 mm to 60 mm away from focusing lens 44 of laser module 34, $Z_R = (d_B - d_A)/2 = 60$ mm$-15$ mm/$2 = 22.5$ mm (see FIG. 5A). Hence, applying the above Rayleigh range equation, and given $\lambda = 0.00068$ mm, convergence angle $\Theta = 0.0062$ radians. The mid-focus distance D (i.e. the distance which is at a midpoint between an object which is 15 mm away from focusing lens 44 and an object which is 60 mm away from focusing lens 44) is 37.5 mm, and therefore the laser beam diameter at lens 44, given a convergence angle $\Theta$ of 0.0062, is 0.24 mm.

For greater scanning accuracy, light should in theory be constrained to a narrow beam that is aligned with the axis of conical mirror 45 and impinges directly on tip 47 of conical mirror 45. Such alignment theoretically produces a laser disc 42 that is substantially planar (i.e. with no gross deviations from the plane) and that is reasonably uniform in intensity at any radius within the scanning range of surface profiler 30. In practice, however, the intensity and spread of laser disc 42 is affected by manufacturing defects in the shape of tip 47 of conical mirror 45. Moreover, it is difficult to perfectly align laser beam 37 with the axis of conical mirror 45. It is possible to reduce the adverse effects of tip defects by spreading the incident light around tip 47 of conical mirror 45. For example, a large diameter laser beam 37 may be emitted by laser diode 31 so that light impinging on conical mirror 45 is distributed on the conical surface surrounding tip 47. Use of a large diameter laser beam also facilitates alignment of the laser beam to the axis of conical mirror 45. However, the use of a large diameter beam would provide a relatively small depth of focus, as compared with a small diameter beam.

Figure 5:
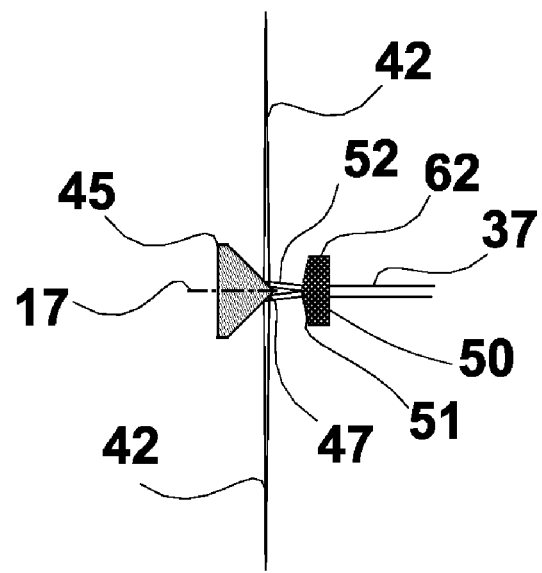
FIG. 5 schematically depicts optical ray tracing for an optical system which may be used in the FIG. 3 surface profiler to spread a light beam emitted by the light source.

A small diameter laser beam 37, providing a larger depth of focus, results in a narrow beam impinging on tip 47 of conical mirror 45. However, defects in the shape of tip 47 may distort the reflection of laser light from conical mirror 45. Also, a surface profiler 30 having a small diameter laser beam 37 is difficult to assemble as it is difficult to precisely align a narrow laser beam 37 with the axis of conical mirror 45. Accordingly, in the illustrated embodiment of FIG. 3, optical system 40 also includes an axicon lens 62 positioned between laser lens 44 and conical mirror 45 for distributing laser light around tip 47 of conical mirror 45. Axicon lens 62 is aligned with its planar surface 50 on the light-incident side of the lens (i.e. toward laser beam 37) and its conical surface 51 on the light-emitting side of the lens (i.e. away from laser beam 37). In some embodiments, axicon lens 62 has a face angle of 10°. As shown in FIG. 5, axicon lens 62 focuses light into a cone-shaped beam 52 which is projected as a ring of light onto conical mirror 45's conical surface surrounding tip 47. Such spreading of light around tip 47 reduces the effects of tip defects.

Figure 7:
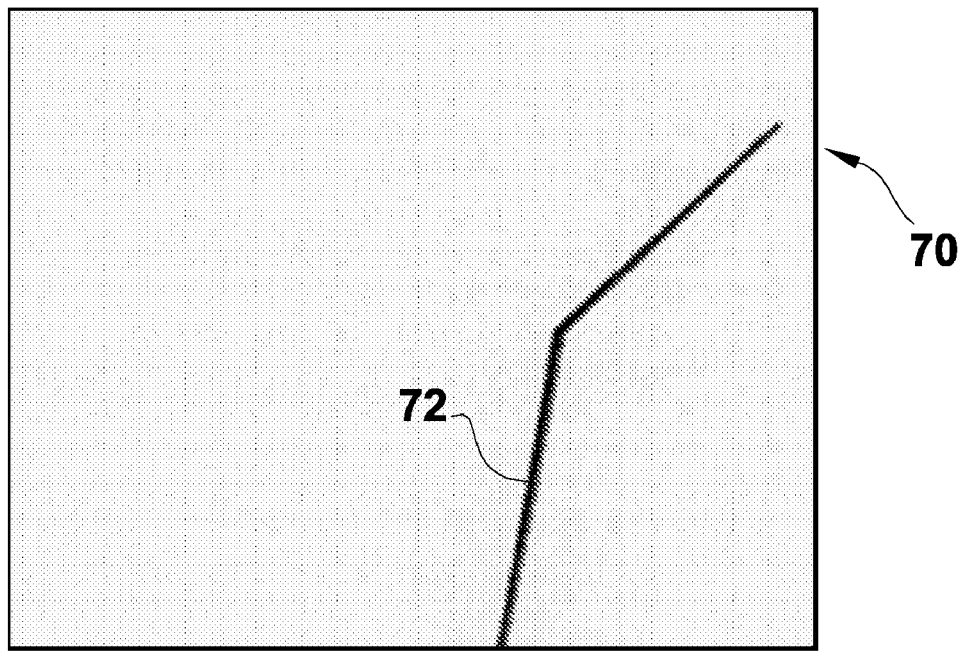
FIG. 7 is a sample image of a surface having two intersecting facets, as captured by an imaging sensor of the FIG. 3 surface profiler.
Figure 8:
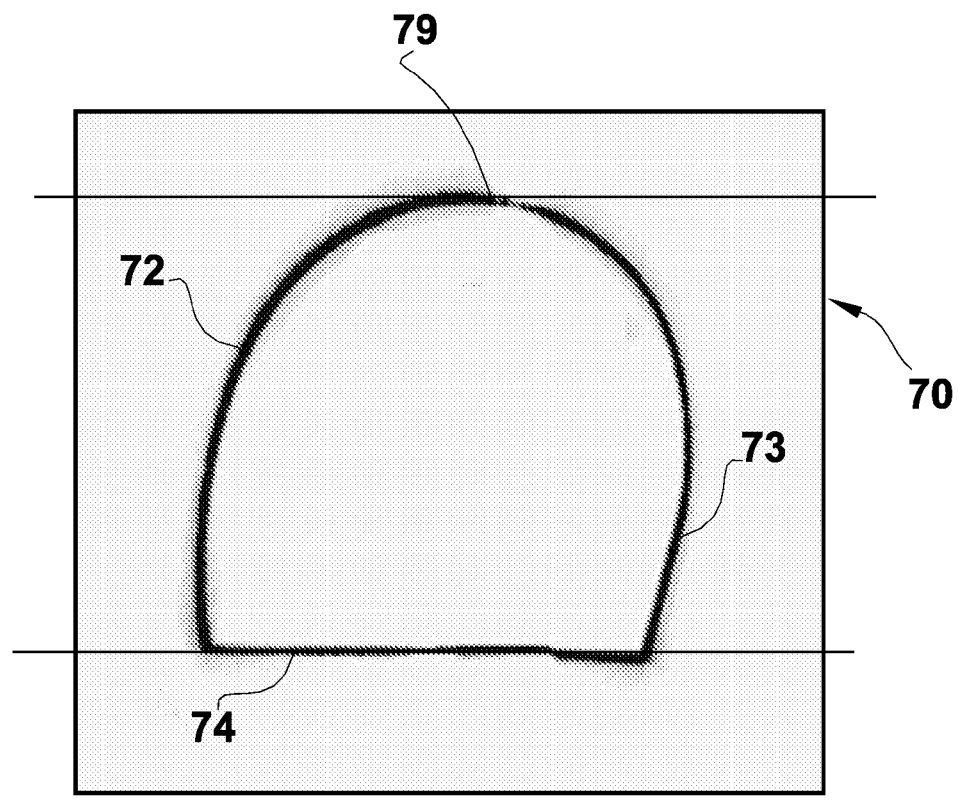
FIG. 8 is a sample image of a surface completely surrounding the surface profiler, as captured by an imaging sensor of the FIG. 3 surface profiler.

In operation, surface profiler 30 is positioned so that laser disc 42 is incident on surface 32. A light ray 41 incident on surface 32 is reflected by surface 32 toward lens 48 as light ray 43. Light ray 43 is focused and imaged by lens 48 onto imaging sensor 46 of camera 36. Camera 36 captures images of the illuminated surface on imaging sensor 46. In some embodiments, camera 36 captures a sequence of video frames of the illuminated surface. FIGS. 7 and 8 show sample video frame images 70 as captured by imaging sensor 46 of camera 36 for scans of different surfaces. Each image 70 depicts a laser line 72 constituting pixels on imaging sensor 46 at which laser light reflected by surface 32 is detected by imaging sensor 46. Laser line 72 of FIG. 7 is representative of a surface having two intersecting facets. Laser line 72 of FIG. 8 is representative of the interior surface of a pipe having a D-shaped cross-section. This surface is imaged as a D-shaped ring having a U-shaped side 73 and a planar side 74.

To obtain a profile of the scanned surfaces, points (x,y) along laser line 72 are located in the plane of imaging sensor 46 (i.e. camera plane 53) and used to determine corresponding points (X,Y) in laser plane 49, based on the relationship between (x,y) and (X,Y) as determined from calibration data for surface profiler 30 (described in detail below). For example, imaging sensor 46 may constitute a 480×480 pixel array, wherein each of the 230,400 pixels of the array is designated by a point (x,y) in camera plane 53 corresponding to a point (X,Y) in laser plane 49.

Figure 7A:
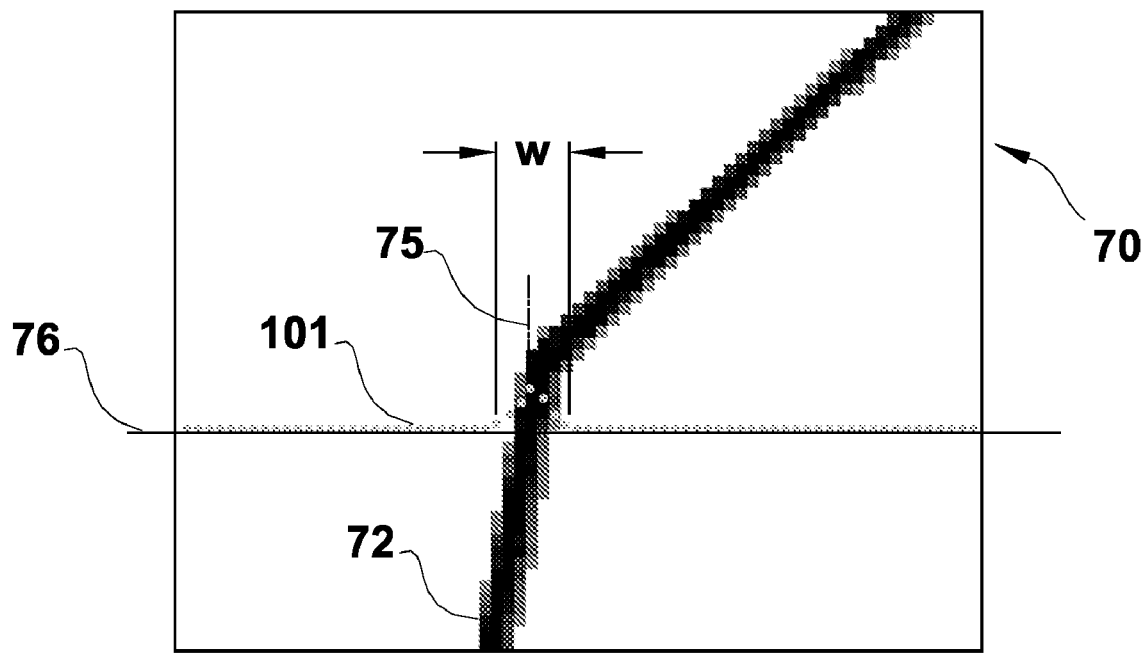
FIG. 7A is an enlarged view of a section of FIG. 7, showing a plot of the intensity of each sensor pixel along a horizontal scan line.

To accurately measure the scanned surface, each image is processed to locate the centroids of the imaged laser line. As seen in FIG. 7A, which is an enlargement of the image in FIG. 7, laser line 72 is multiple pixels wide and the light intensity as detected by each pixel varies across a width w of laser line 72. The light intensity tends to increase toward the center of each width w, and reaches its maximum value at the midpoint of laser line 72. Plot 101 is a plot of the intensity of light detected by the pixels along a single horizontal video scan line 76 of image 70. For scan line 76, centroid 75 is a point along scan line 76 representing the midpoint of the laser beam on scan line 76. A centroid of the imaged laser beam is the midpoint of laser line 72 on a scan line which crosses perpendicularly to laser line 72.

Centroid 75 may be computed from the intensity profile across multiple pixels along a scan line in a particular direction (e.g. along scan line 76), using one of several known methods, including geometric mean calculation, as described in U.S. Pat. No. 4,498,778 (White). However, it may be difficult to determine an accurate centroid of a laser line by scanning an image in an arbitrary direction without knowing the object's general shape. For example, if the D-shaped ring in FIG. 8 is scanned horizontally, laser line 72 will appear twice on many horizontal scan lines, raising the question of which laser line should be used to compute the centroid. Moreover, a horizontal scan line which crosses a rounded top edge 79 of the D-shaped ring will cross laser line 72 obliquely. An oblique scan of the laser line makes it difficult to locate the centroid as there may be a wide region of higher intensity pixels or multiple regions of maximum intensity along the scan line. Similar problems occur for a horizontal scan line that crosses laser line 72 at the bottom of the D-shaped ring (i.e. along planar side 74). For optimal centroid processing, each scan line should cross laser line 72 at right angles to laser line 72.

Figure 9:
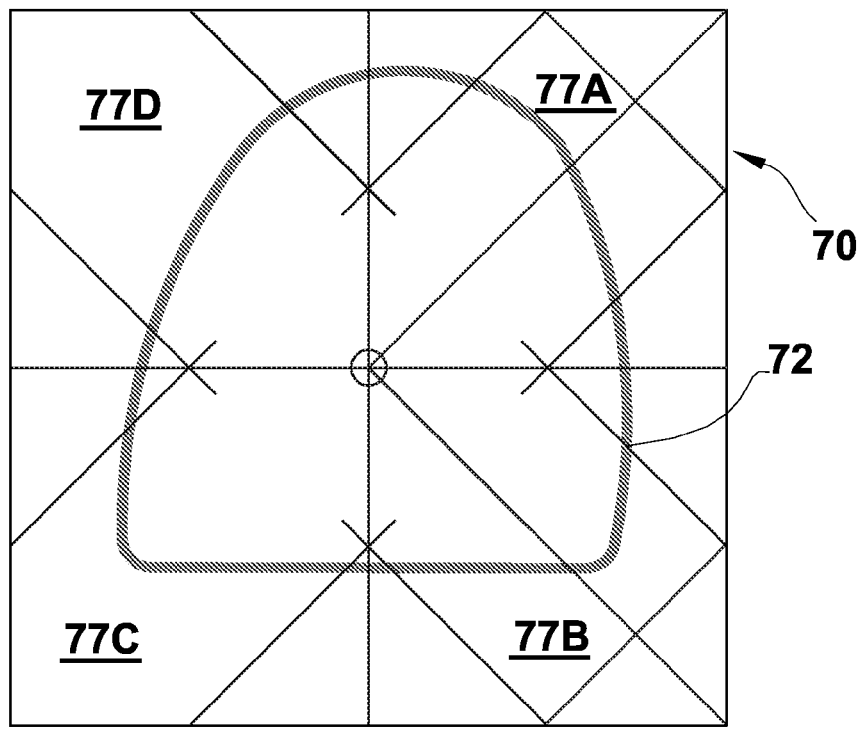
FIG. 9 is a sample image of another surface completely surrounding the surface profiler, as captured by an imaging sensor of the FIG. 3 surface profiler.

In some embodiments, a solution to the foregoing difficulties is provided by scanning an image multiple times, in different directions; locating the centroids for each scan line from the intensity profile along each scan line; and processing the aggregate centroid data to select the centroids of the imaged laser beam (i.e. a series of points representing the midpoints of the imaged laser line). In particular embodiments, an image 70 is divided into four quadrants 77A, 77B, 77C and 77D (FIG. 9) and sections of the image are scanned horizontally, vertically and diagonally (at 45° to the horizontal). For example, an image may be scanned eight times, as follows:

the left half of image 70 (quadrants 77C, 77D) is scanned from left to right along horizontal scan lines;

the right half of image 70 (quadrants 77A, 77B) is scanned from right to left along horizontal scan lines;

the upper half of image 70 (quadrants 77A, 77D) is scanned from top to bottom along vertical scan lines;

the lower half of image 70 (quadrants 77B, 77C) is scanned from bottom to top along vertical scan lines; and each of the four quadrants 77A, 77B, 77C, 77D of image 70 is scanned along diagonal (e.g. 45°) scan lines proceeding from the outermost corner of image 70 to the centre of image 70.

The foregoing scans may be used to compute eight sets of centroids (one set for each of the eight scans). Typically the same centroid points will appear in two or three sets of scan data (i.e. the centroid along a line in a particular scan direction will coincide with a centroid for one or two other lines in different scan directions). The scan data is filtered and processed to select the centroids for the imaged laser line. For example, the scan data may be filtered and/or processed:

to disregard image data for pixels corresponding to locations within housing 38 of surface profiler 30, as the scanned surface will always be outside of housing 38;

to reject all image data on a particular scan line if the width of laser line 72 along the scan line is greater than a threshold width indicative of a scan line which is touching an edge of laser line 72 or intersecting laser line 72 obliquely (such situations may yield uncertain centroid data given that there may be a wide region of higher intensity pixels or multiple regions of maximum intensity along the scan line); and to assign a quality value to each centroid, as described in US Patent Application Publication No. 2005/0111009 (Keightley et al.), to enable selection of a centroid by quality value if more than one centroid is determined for intersecting scan lines.

Image data may be further processed by estimating the shape of the scanned object, so that a processing direction closest to the ideal 90° crossing of the imaged laser line may be identified. Centroids may be selected from that processing direction.

The centroid for each scan line may be calculated to a precision of 1/16th of a pixel along the scan line. The scan lines are spaced apart from one another by one pixel. Therefore, centroids from different scan lines (e.g. horizontal, vertical and 45° scan lines) will typically not coincide precisely in (X,Y) coordinates. However, a region of interest (e.g. a square with one-pixel length sides to preserve the resolution of the profiler) may be considered for the purposes of determining whether centroids for multiple scan lines coincide. If only one centroid is determined for a set of scan lines in the different scan directions (i.e. there is only one centroid from the different scan directions in a region of interest), then that centroid may be selected as the centroid of the imaged laser line. If more than one centroid is determined within a region of interest for a set of scan directions, the centroid data is processed to select one of the centroids as a centroid of the imaged laser beam. For example, the quality tag values of each centroid may be compared. The centroids having appreciably lower tag values (e.g. tag values below a certain threshold value) are discarded. After an initial profile of the target surface has been reconstructed from the image data, the crossing angle of each scan line (i.e. the angle between the scan line and the imaged laser line) at points along the profile may be determined. The centroid from a scan direction which is closest to a perpendicular crossing of the profile may be selected as a centroid for the imaged laser line.

Tagging of centroids may be performed by control and processing unit 61 before the tagged data is transmitted to a computer for further processing. The other centroid processing steps described above may be performed by the computer executing suitable software instructions.

Once an image is processed to determine and select the centroids of a laser line, the centroids (x,y) of the laser line in camera plane 52 may be used to determine corresponding locations (X,Y) in laser plane 49. The relationship between points (x,y) in camera plane 53 and corresponding points (X,Y) in laser plane 49 may be determined by collecting calibration data for surface profiler 30. Generally, calibration data for a limited number (e.g. approximately 1000) of sample (X,Y)-(x,y) pairs is collected and calibration data for the remainder of the pixels in camera plane 52 is calculated by mathematical methods which are described below.

Figure 6A:
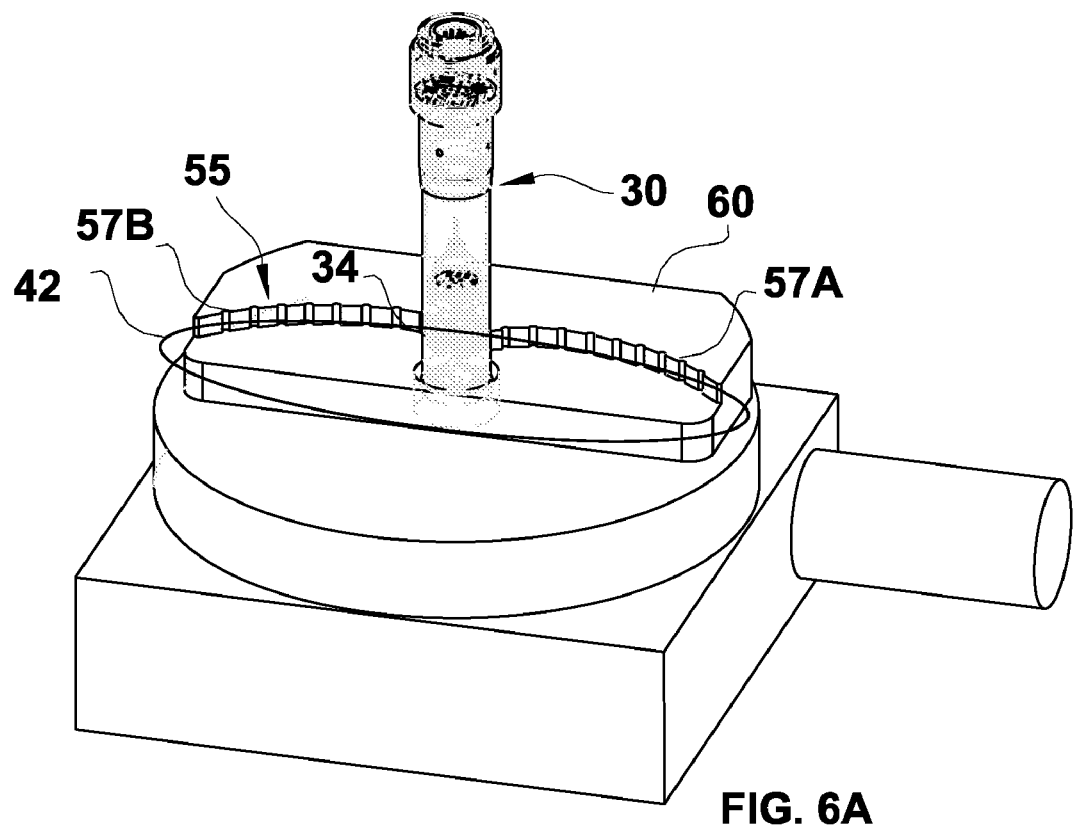
FIG. 6A is a perspective view of a calibration target which may be used in calibrating the FIG. 3 surface profiler.
Figure 6B:
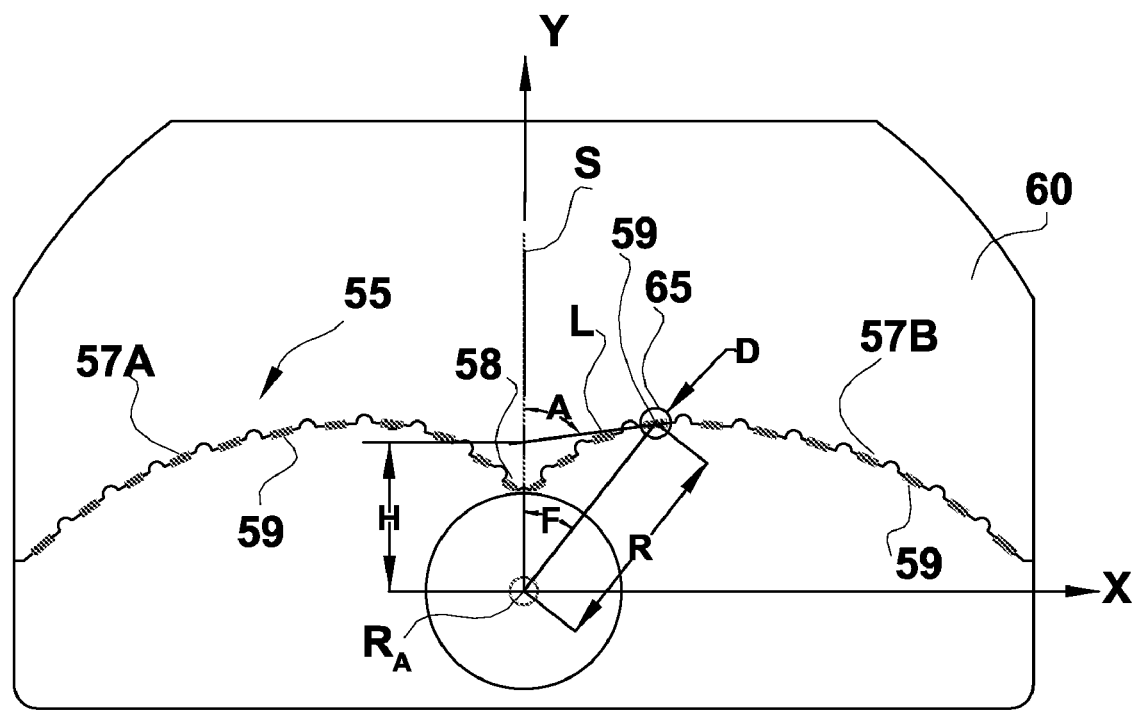
FIG. 6B is a top elevation view of the FIG. 6A calibration target.
Figure 6C:
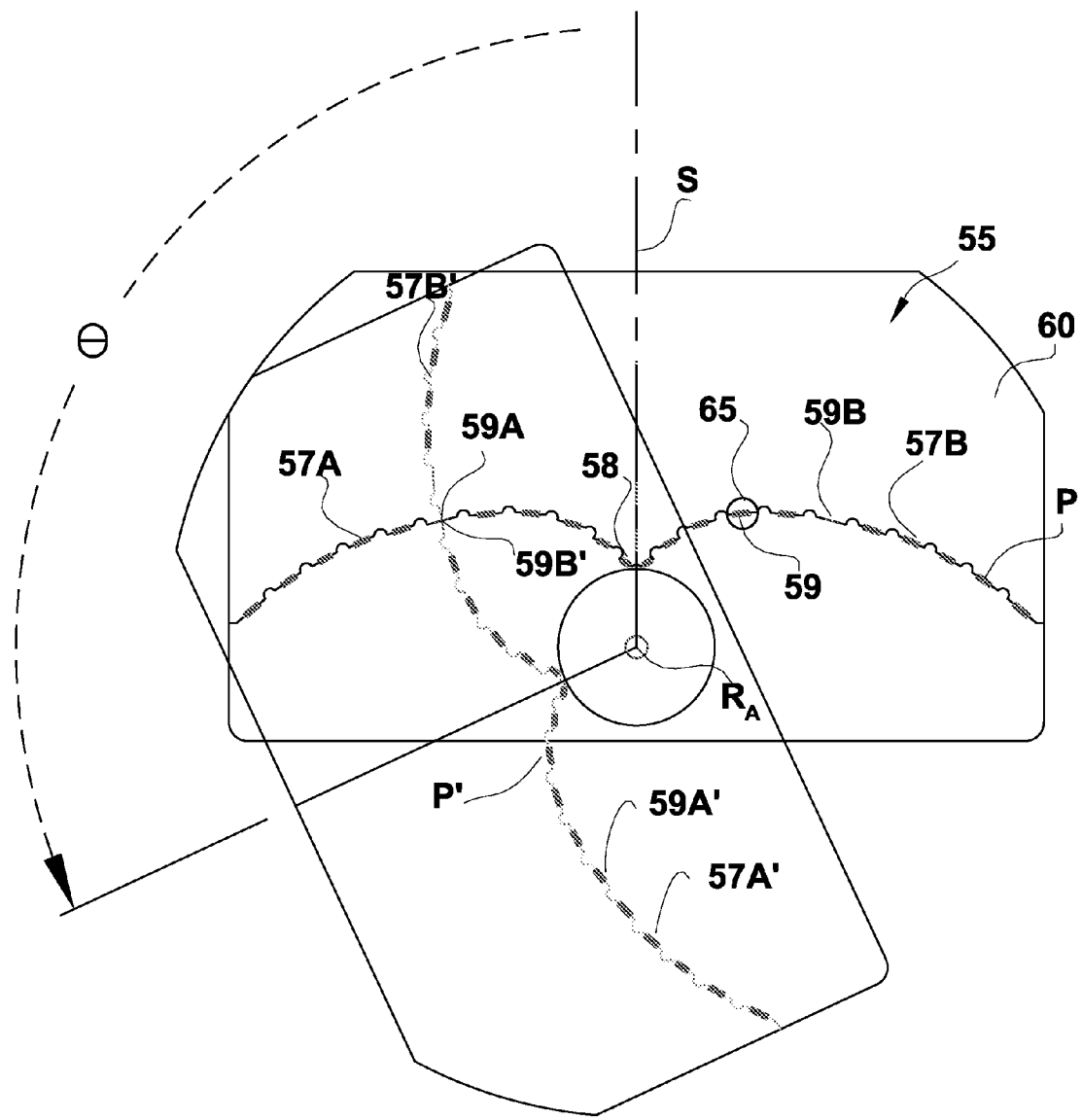
FIG. 6C is a top elevation view of the FIG. 6A calibration target shown in two different positions relative to its rotation axis.

In some embodiments, calibration of surface profiler 30 is performed by illuminating a calibration target 55 with light from laser diode 31 of surface profiler 30, rotating target 55 to known positions about rotation axis $R_A$, and taking camera images (such as video images) of the illuminated target 55 at each position (see FIGS. 6A, 6B and 6C). Target 55 may have a pair of arms 57A, 57B (collectively, arms 57) which are symmetrical about a line of symmetry S. Arms 57 may be side-by-side arches which extend outwardly from a point 58 on line S.

Each arm 57 may be formed of n spaced apart segments 59 symmetrically arranged about line S. The curvature of each segment 59 is negligible so that each segment 59 may be characterised as a straight line on laser plane 49 for calibration purposes, as described in more detail below. In some embodiments, each segment 59 is long enough to provide image data for at least six (X,Y) points along each segment, when scanned, so that a suitable line may be fit to the (X,Y) points. The spacing between adjacent segments 59 should be large enough so that (X,Y) points for each segment 59 are not confused with those of an adjacent segment 59. In some embodiments, the spacing between adjacent segments 59 is at least two to three (X,Y) points of separation. Each of the n segments 59 may be sequentially numbered to identify the segment's respective position k on arm 57 (wherein $1 \leq k \leq n$, and the highest integer identifies the position of the outermost segment 59 on arm 57).

Segments 59 may be mounted to a level platform 60. Platform 60 is rotatable about a rotation axis $R_A$ which intersects line S at a distance from point 58, and is oriented perpendicularly to platform 60. Platform 60 is equipped with a rotary encoder on rotation axis $R_A$. During calibration, surface profiler 30 is positioned so that when laser diode 31 is activated to emit light, the axis of laser disc 42 is aligned with rotation axis $R_A$, laser plane 49 (i.e. the plane defined by laser disc 42) is parallel to platform 60, and light from laser disc 42 is incident on all segments 59. Once surface profiler 30 is in position, target 55 is set in motion by rotating platform 60. Target 55 is illuminated by laser disc 42 while camera 36 of surface profiler 30 captures images of target 55. In some embodiments, target 55 is continually rotated, camera 36 takes video images of target 55, and image data for a video frame is periodically saved. At each exposure for which a video frame is saved, encoder data indicating the position of target 55 (i.e. angle of rotation) is read from the encoder and is saved along with the image data obtained for that exposure. In other embodiments, encoder data indicating the position of target 55 is monitored as target 55 rotates. A controller (e.g. control and processing unit 61) is configured to generate a control signal triggering camera 36 to capture and save an image when target 55 is at certain positions as determined from the encoder data. In this manner, images of target 55 may be captured by camera 36 for every 1° of rotation of target 55, for example.

Arms 57 are oriented on platform 60 so that as platform 60 is rotated about rotation axis $R_A$, superimposed images of target 55 at different positions show an intersection at substantially right angles of an arm 57A in one position with an arm 57B in the other position. For example, FIG. 6C shows target 55 in a first position P and in a second position P' after having been rotated by rotation angle θ about rotation axis $R_A$. The components of target 55 at positions P, P' are identified by the same reference numerals in FIG. 6C, except that a prime symbol is used to designate the components of the target at position P'. FIG. 6C illustrates that an image of arm 57A at position P will intersect at substantially right angles with a superimposed image of arm 57B' at position P'. More specifically, an image of segment 59A of arm 57A in position P will intersect with a superimposed image of a segment 59B' of arm 58B' in position P'. In some embodiments, segments 59 are arranged symmetrically, or roughly symmetrically, about line S. Therefore intersecting segments 59A, 59B' may have the same respective position k on each of arms 57. For example, in FIG. 6C the sixth segment of arm 57A is shown intersecting with the sixth segment of arm 57B'. Strict symmetry of arms 57 is not necessary however for calibration purposes, as the location and parameters of each segment 59 on each arm 57 may be measured independently to determine a point of intersection of arms 57A, 57B'.

Each image captured by camera 36 may be processed to locate the centroids of laser lines. For example, the images of target 55 at positions P and P' may be processed according to the image processing techniques described above to determine the centroids of imaged laser lines corresponding to segments 59A, 59B'. In processing the pixels of an image, only pixels inside a circular region 65 surrounding each segment 59 need to be examined as pixels outside these regions are irrelevant for collecting calibration data. Using the centroids obtained from the image processing, a line intersect point $(x_i, y_i)$ in camera plane 53 may be located for the intersection of segments 59A, 59B'.

Line intersect point $(x_i, y_i)$ in camera plane 53 corresponds to a point $(X_i, Y_i)$ in laser plane 49 at which the segments 59A, 59B' would theoretically intersect if positioned as shown in FIG. 6C. Point $(X_i, Y_i)$ in laser plane 49 may be calculated based on encoder data (which provides the rotation angle of target 55) and the physical parameters of intersecting segments 59A, 59B'.

By processing pairs of images of target 55 at different angles of rotation, and determining the location of each line intersect point $(x_i, y_i)$ in camera plane 53 and its corresponding point $(X_i, Y_i)$ in laser plane 49, a number of sample (x,y)-(X,Y) calibration pairs may be collected to determine the relationship between points in the camera plane and points in the laser plane.

Software may be used to calculate an intersection point $(X_i, Y_i)$ in laser plane 49 for a particular pair of images. The software assumes that the curvature of each segment 59 is negligible so that segment 59 may be represented by a line L in laser plane 49. Each segment 59 may be characterised by the following parameters (see FIG. 6B):
- the angle F to the midpoint of the segment 59 from an arbitrary zero axis (e.g. the Y-axis in FIG. 6B);
- the angle A of line L to the arbitrary zero axis;
- the intercept H of line L with the Y-axis;
- a circular region 65 that encloses segment 59 only and no other segment;
- the diameter D of circular region 65; and
- the distance R between circular region 65 and rotation axis $R_A$.

The above parameters are known for each segment 59 at each position k. Given the position k of segment 59B on arm 57, and the rotation angle θ of target 55 as determined from the encoder data, a line $L_B'$ representing segment 59B' (at position P') may be determined. The intersection of line $L_B'$ with a line $L_A$ representing segment 59A provides point $(X_i, Y_i)$ on laser plane 49 for the intersection of segments 59B', 59A.

For example, to calculate intersection point $(X_i, Y_i)$ in FIG. 6C, line $L_B'$ for segment 59B' is determined by rotating line $L_B$ by rotation angle θ about rotation axis $R_A$ (which may be conveniently assigned coordinates (0,0)). A point (x,y) on line $L_B$ which is rotated by angle θ about point (0,0) moves to a point (x',y') on $L_B'$. Point (x,y) is related to point (x',y') as follows:

$$x' = x \cos θ - y \sin θ$$

$$y' = x \sin θ + y \cos θ$$

If the y-intercept point (0, H) of line $L_B$ is considered, the x-component of the above equations is zero, and the equations therefore reduce to:

$$x' = -H \sin θ$$

$$y' = H \cos θ$$

Thus, a point (x',y') on line $L_B'$ is located by knowing the y-intercept of line $L_B$ (i.e. parameter H of segment 59B). Also, the slope $m_B'$ of line $L_B'$ is related to the rotation angle θ and angle A of line $L_B$ as follows:

$$m_B' = \tan(θ + 90 - A),$$

where all angles are represented in degrees. Thus, an equation (in the form y=mx+b) for line $L_B'$ may be generated from point (x',y') on line $L_B'$ and slope $m_B'$ of line $L_B'$ as given above.

An equation representing line $L_A$ of segment 59A may also be generated from a known point on line $L_A$ and slope $m_A$ of line $L_A$. The known point may be the y-intercept of line $L_A$ (which is the same as parameter H of segment 59B). The slope $m_A$ of line $L_A$ is related to angle A of segment 59B as follows:

$$m_A = \tan(90 + A),$$

where all angles are represented in degrees.

Given line equations for lines $L_B'$ and $L_A$, the x and y variables of line equations $L_B'$ and $L_A$ may be equated and solved to locate the intersection point $(X_i, Y_i)$ of segments 59A, 59B' in laser plane 49. Intersection point $(X_i, Y_i)$ will correspond to a line intersect point $(x_i, y_i)$ in camera plane 53, as determined from image processing.

After data is collected for a number of sample (x,y)-(X,Y) calibration pairs, various methods may be used to generate calibration data for the entire camera space, namely, the extent of camera plane 53 within the camera field of view. These methods may include:
- using the (x,y)-(X,Y) calibration pairs to fit a theoretical camera model, which is then used to fit the entire camera space;
- interpolating between the (x,y) calibration points (i.e. the "calibrated space"), and extrapolating for the remainder of the camera space; and
- using the (x,y)-(X,Y) calibration pairs to fit a theoretical camera model, which is then used to generate points to a limited extent outside of the camera field of view (e.g. up to 10 pixels outside the camera field of view). These generated points are then used to interpolate points that lie between the boundary of the "calibrated space" and the boundaries of the camera field of view. Interpolation or other methods may be used to generate points within the calibrated space.

In other embodiments, calibration data for surface profiler 30 may be collected using other methods. For example, a planar target having an array of dots at known locations may be placed in laser plane 49, and imaged by camera 36 of surface profiler 30. To produce accurate calibration data, the dots are aligned precisely with the laser plane. Also, this method assumes that the dots are imaged in such a way that the center of a dot corresponds to the point illuminated by a laser beam.

Figure 6D:
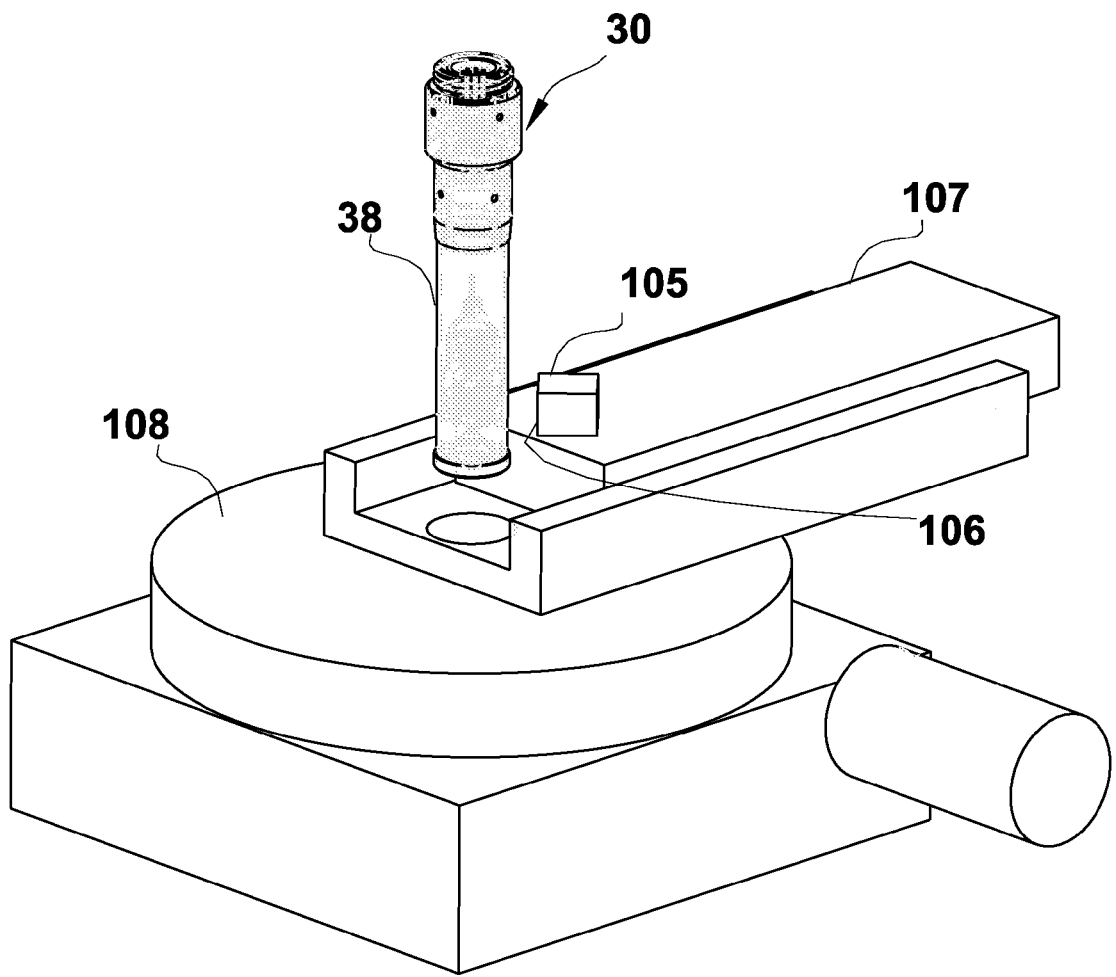
FIG. 6D is a perspective view of another calibration target which may be used in calibrating the FIG. 3 surface profiler.

Another calibration method involves moving a calibration target to different, known positions in the laser plane, and illuminating the target at each position. A calibration target 105 according to an embodiment of this method is shown in FIG. 6D. Target 105 has two faces intersecting at an apex or edge 106. For example, target 105 may be a cube. Target 105 may be mounted to a linearly-moveable platform 107 which is in turn mounted on a rotatable platform 108. Platforms 107, 108 may be equipped with encoders. Apex 106 is presented to lens 48 of camera 36 of surface profiler 30, and laser disc 42 is projected onto the intersecting faces of target 105. Target 105 is moved to known positions (as determined by the encoder data) by sliding platform 107 linearly, and/or by rotating platform 108. Camera 36 of surface profiler 30 takes images of the target at each position. The tip of apex 106 represents a known (X,Y) calibration point which is recovered in the captured camera image by fitting straight lines to the imaged laser lines and determining the intercept of the straight lines to locate a corresponding point (x,y) in camera plane 53.

Figure 13:
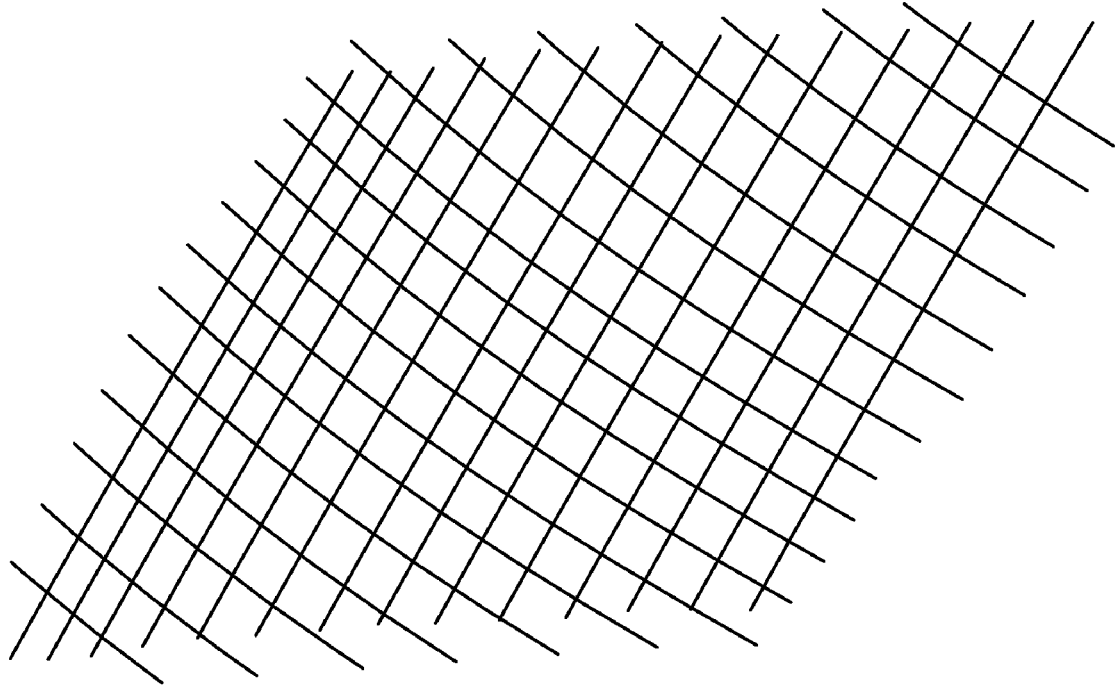
FIG. 13 illustrates a grid of imaged lines generated by an imaging sensor in calibrating a surface profiler according to one embodiment.

In other calibration methods, the calibration target illuminated by surface profiler 30 may be a straight edge oriented to extend across the camera field of view at 45°. The target is moved in a controlled manner and imaged at successive line positions to generate a first set of imaged parallel laser lines across the camera field of view. The target is then rotated by 90° and again moved in a controlled manner and imaged at successive line positions to generate a second set of imaged parallel laser lines (which are all perpendicular to the first set of imaged laser lines) across the camera field of view. The images are processed to select the centroids of the imaged laser lines, thereby generating a grid of lines in camera plane 53 (see FIG. 13). The intercepts (x,y) of lines in the grid represent known (X,Y) locations in laser plane 49 as determined from the controlled motion of the target. This calibration method may be used to generate several hundreds of (x,y)-(X,Y) calibration pairs with a reasonable degree of accuracy.

Figure 10:
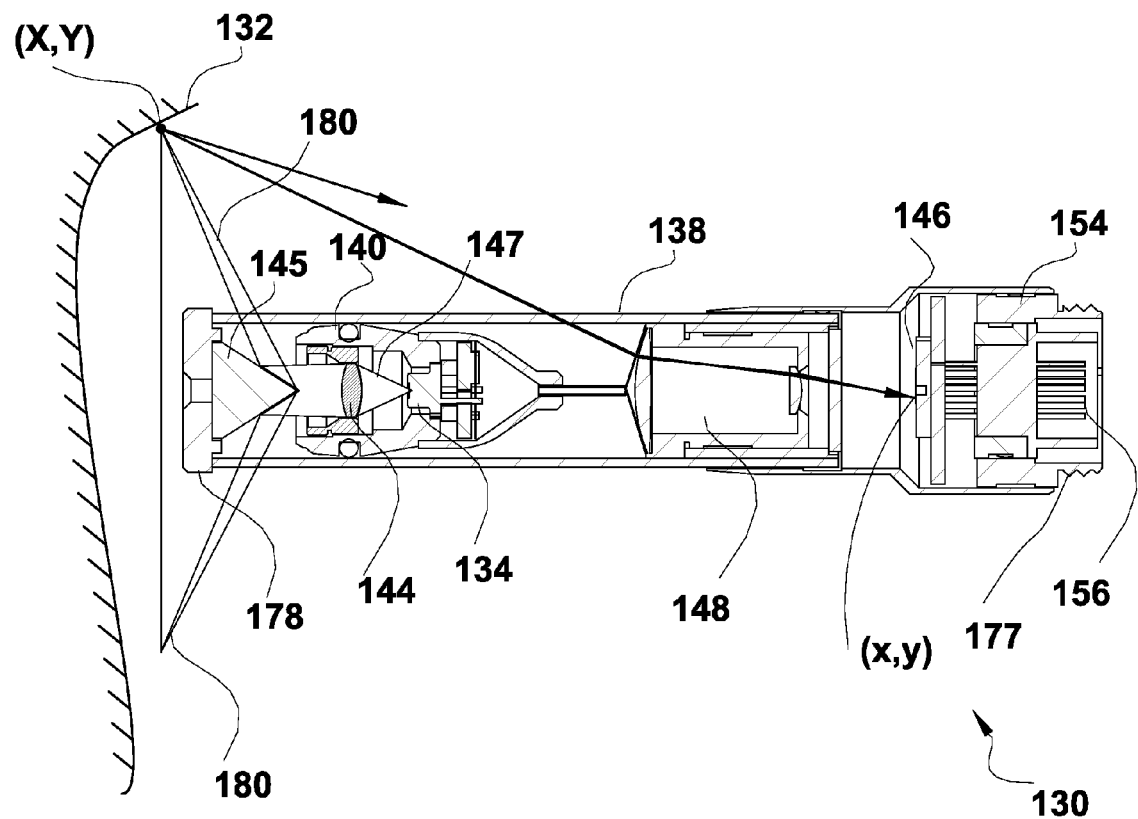
FIG. 10 is a sectional view of another surface profiler and includes optical ray tracing for a cone-shaped scanning beam.

The previously described surface profiler 30 is capable of scanning surfaces which are in the plane of laser disc 42. Due to the physical arrangement of optical system 40 within housing 38, the plane of laser disc 42 is located behind the front end 78 of housing 38. In some situations it may be desirable to scan surfaces located beyond (i.e. forwardly of) front end 78 of housing 38. For example, the operator may wish to illuminate and scan the bottom or lower side walls of holes located beyond front end 78 of housing 38, where contact between housing 38 and the target surface would otherwise inhibit or obstruct the scanning of the target surface using a laser disc 42 perpendicular to the axis of the surface profiler. FIG. 10 shows a surface profiler 130 for scanning a surface 132 located beyond front end 178 of housing 138. Surface profiler 130 is similar in some respects to surface profiler 30 and similar reference numerals are used herein to refer to similar features. However, features of surface profiler 130 are prefixed with a "1" (e.g. housing 138 of surface profiler 130 corresponds to housing 38 of surface profiler 30).

Optical system 140 of surface profiler 130 includes a laser lens 144 and a conical mirror 145. Conical mirror 145 has a cone angle which is less than 90°. In some embodiments, the cone angle is between 75° and 90°. Because the cone angle is less than 90°, laser light emitted from laser diode 131 is redirected by conical mirror 145 into a cone-shaped beam 180 toward front end 178 of housing 138, rather than as a disc-shaped beam oriented perpendicularly to the axis of the surface profiler as in the case of conical mirror 45 of surface profiler 30. Surface 132 as seen in FIG. 10 is typical of the kinds of surfaces that may be scanned by surface profiler 130 using a forward-projecting cone-shaped beam 180, but not using a laser disc which is perpendicular to the axis of the surface profiler.

Figure 12:
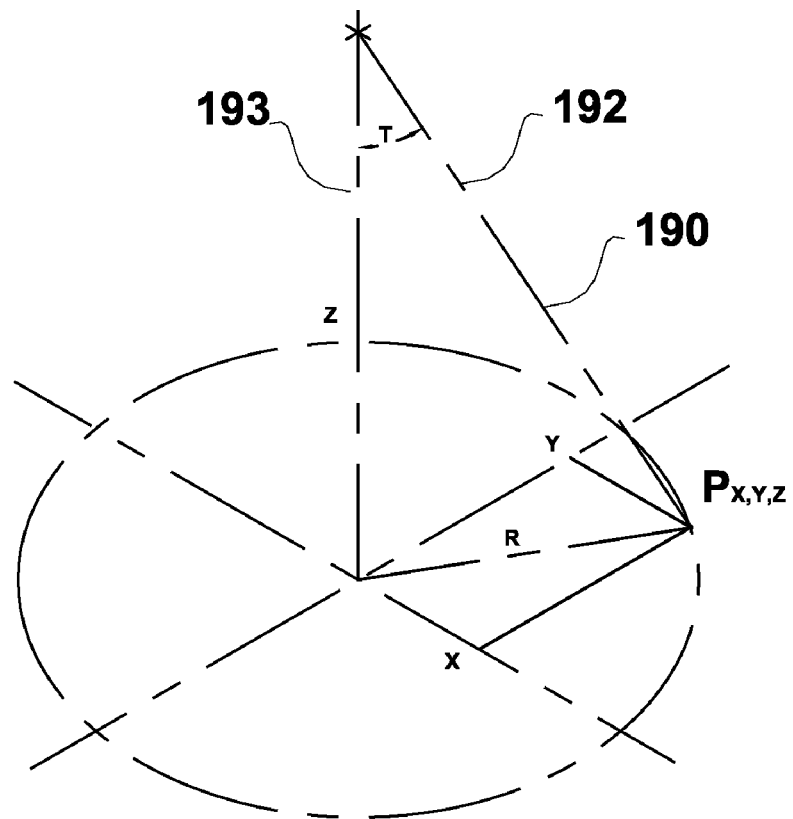
FIG. 12 depicts a ray of a cone-shaped scanning beam incident on a planar surface.

Surface profiler 130 may be calibrated by using the calibration methods described above to determine (X,Y) points on the target surface. Each (X,Y) point lies on a surface 190 of the cone 192 described by cone-shaped beam 180 (FIG. 12). For example, surface profiler 130 may be positioned to illuminate the rotating target 55 of FIGS. 6A, 6B and 6C, and camera images may be captured and processed to locate points (x,y) on camera plane 53 corresponding to points (X,Y) on surface 190. As cone-shaped beam 180 has a third dimension (i.e. a Z dimension), it is also necessary to perform further calibration steps to determine a Z-value associated with an (X,Y) point on surface 190. A Z-value is related to the angle T between surface 190 and axis 193, as follows:

$$Z = \frac{R}{\tan T}$$

where R is the distance from axis 193 of cone 192 to the incident point (X,Y,Z) on the target surface. R is related to X and Y as follows:

$$R = \sqrt{X^2 + Y^2}$$

Thus, given a point (X,Y) and the angle T, the Z-value can be calculated from the above equations. Angle T may be determined by positioning a flat target plane perpendicularly to axis 193 of cone 192 at a known axial (Z) location. Cone-shaped beam 180 illuminates the target plane to generate an image of (x,y) points on a circle in camera plane 53. This image is processed to generate a set of (X,Y) values at a known Z value. The flat plane is subsequently moved to a new axial location and another set of (X,Y) values is generated at the new, known Z value. These steps are repeated for multiple axial locations to obtain multiple sets of (X,Y) values for known Z values. Angle T may then be calculated using a least squares fitting technique to fit the data to the relationship between X,Y,Z and T.

The calibration technique described above requires the target plane to be aligned precisely normal to axis 193 of cone 192. Imprecise alignment may be accommodated by introducing two extra angles $\phi_x$ and $\phi_y$ defining the skew of the normal of the target plane to axis 193 of cone 192. There is sufficient redundancy in the X,Y,Z data sets to permit computation of angles $\phi_x$ and $\phi_y$ using the least squares fitting technique.

Figure 11:
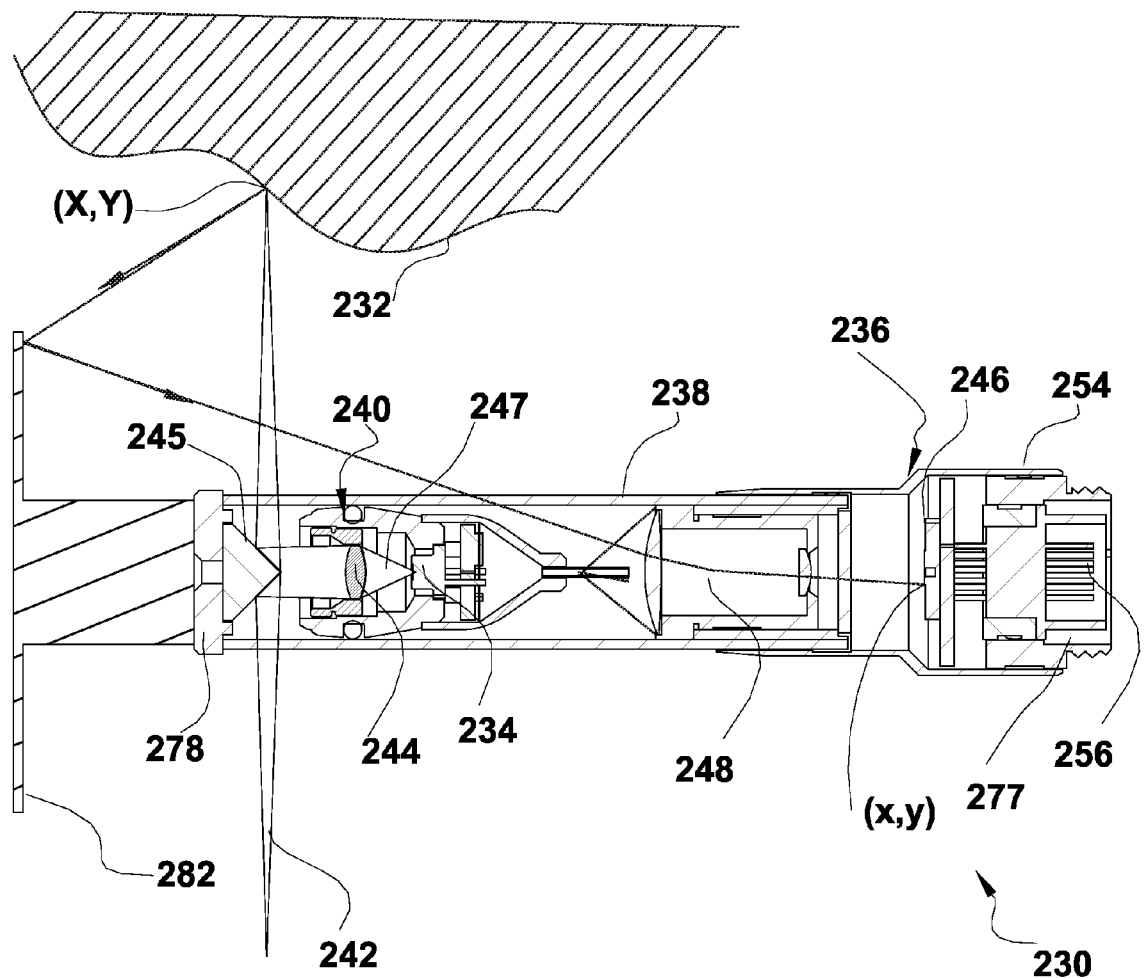
FIG. 11 is a sectional view of yet another surface profiler and includes optical ray tracing for a mirror which redirects light reflected from the target surface onto an imaging lens.

The previously described surface profiler 30 is capable of scanning surfaces directly viewable by camera 36. The viewing by camera 36 of light incident on the target surface may be obscured by inwardly sloping surfaces, protrusions or other obstructions between the light incident point (X,Y) on the target surface and lens 48 of camera 36. By contrast, surface profiler 230 shown in FIG. 11 is capable of scanning surfaces for which direct viewing by camera 236 is obstructed by the shape of the scanned object. Surface profiler 230 is similar in some respects to surface profiler 30 and similar reference numerals are used herein to refer to similar features. However, features of surface profiler 230 are prefixed with a "2" (e.g. housing 238 of surface profiler 230 corresponds to housing 38 of surface profiler 30).

Surface profiler 230 incorporates a planar mirror 282 attached to housing 238 at front end 278 of housing 238. Planar mirror 282 is oriented parallel to laser disc 242. As seen in FIG. 11, laser disc 242 is incident on a point (X,Y) on surface 232. Surface 232 slopes toward lens 248 of camera 236 so that camera 236 is unable to directly view the light incident point (X,Y) on surface 232. However, light incident at point (X,Y) is reflected toward mirror 282 and redirected by planar mirror 282 toward lens 248 of camera 236. Therefore camera 236 images a reflected view of the illuminated surface 232.

Surface profiler 230 may be calibrated using the calibration methods described for surface profiler 30. Planar mirror 282 may cause camera 236 to view the same point (X,Y) on the target surface at two different points (x,y) on the camera field of view. Therefore, portions of camera plane 53 which detect light reflected from planar mirror 282 may be calibrated separately from portions of camera plane 53 which do not detect light reflected through planar mirror 282. The boundary between these portions may be a circle or a band on camera plane 53. For example, the camera field may be divided into two concentric annular regions. One of the annular regions shows an image of light as reflected from planar mirror 282 and the other of the annular regions shows a direct image of light (as reflected directly from surface 232). The boundary between the two annular regions may be determined by the diameter of planar mirror 282. Profiles of objects may appear in the camera field as two laser lines (e.g. a line which is reflected by the mirror and a line which is imaged directly), or as just one laser line (either reflected by the mirror or imaged directly). There may be certain types of objects (e.g. undercut spaces) which are imaged as one laser line in the camera field, and it may be unclear whether this line is reflected by the mirror or imaged directly. Such a problem may be resolved by processing the centroids of the laser line in two parallel paths and constructing two object models in XY space (one assuming that the line is reflected by the mirror and the other assuming that the line is imaged directly). One of these models will show a discontinuity. The remaining model is the correct model.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A surface profiler, comprising:
a transparent housing;
a focusable light source;
a conical mirror aligned to redirect light emitted by the light source onto a surface to be profiled;
an imaging sensor;
a lens aligned to redirect toward the imaging sensor light reflected by the surface onto the lens; and
an axicon lens positioned between the light source and the conical mirror, the axicon lens aligned to focus light emitted by the light source into a cone-shaped beam;
wherein the light source, the conical mirror, the imaging sensor and the lens are mounted within the housing and positionally referentially coupled to the housing.

2. A surface profiler as defined in claim 1, wherein the conical mirror has a cone angle of 90°.

3. A surface profiler as defined in claim 1, wherein the conical mirror has a cone angle of between 75° and 90°.

4. A surface profiler as defined in claim 1, further comprising a planar mirror positionally referentially coupled to the housing, the planar mirror aligned to redirect toward the lens light reflected by the surface onto the planar mirror.

* * * * *